United States Patent
Aga et al.

(10) Patent No.: US 11,441,956 B1
(45) Date of Patent: *Sep. 13, 2022

(54) SYSTEM AND METHOD FOR FABRICATING A STRAIN SENSING DEVICE DIRECTLY ON A STRUCTURE

(71) Applicant: Government of the United States as represented by the Secretary of the Air Force, Wright-Patterson AFB, OH (US)

(72) Inventors: Roberto S. Aga, Beavercreek, OH (US); Emily M. Heckman, Dayton, OH (US)

(73) Assignee: United States of America as represented by the Secretary of the Air Force, Wright-Patterson AFB, OH (US)

( * ) Notice: Subject to any disclaimer, the term of this patent is extended or adjusted under 35 U.S.C. 154(b) by 169 days.

This patent is subject to a terminal disclaimer.

(21) Appl. No.: 16/992,169

(22) Filed: Aug. 13, 2020

Related U.S. Application Data

(63) Continuation-in-part of application No. 16/377,302, filed on Apr. 8, 2019, now Pat. No. 10,770,206.

(51) Int. Cl.
 *G01L 1/00* (2006.01)
 *G01L 1/18* (2006.01)

(52) U.S. Cl.
 CPC .................................. *G01L 1/18* (2013.01)

(58) Field of Classification Search
 CPC ......... G01L 1/18; G01L 1/2287; H01C 7/065; H01C 10/10
 See application file for complete search history.

(56) References Cited

U.S. PATENT DOCUMENTS

| 4,202,007 A * | 5/1980 | Dougherty | H05K 1/0298 257/E23.173 |
| 10,770,206 B1 * | 9/2020 | Aga | G01L 1/18 |
| 2005/0140493 A1 * | 6/2005 | Morikawa | G01L 1/18 250/234 |
| 2010/0035375 A1 * | 2/2010 | Grigoropoulos | H01L 21/288 977/773 |
| 2017/0236625 A1 * | 8/2017 | Saito | H01C 17/23 73/1.15 |

* cited by examiner

*Primary Examiner* — Max H Noori
(74) *Attorney, Agent, or Firm* — AFMCLO/JAZ; Matthew D. Fair

(57) ABSTRACT

Various deficiencies in the prior art are addressed by systems, methods, architectures, mechanisms and/or apparatus configured for fabricating a strain sensing device directly on a structure by printing or otherwise depositing a material on the structure, the material exhibiting a piezo-resistive effect, and sintering a strain sensing pattern from the material such that the strain sensing pattern becomes electrically conductive.

21 Claims, 3 Drawing Sheets

SYSTEM AND METHOD FOR FABRICATING A STRAIN SENSING DEVICE DIRECTLY ON A STRUCTURE

GOVERNMENT INTEREST

The embodiments described herein may be manufactured, used and/or licensed by or for the United States Government without the payment of royalties thereon.

FIELD OF THE DISCLOSURE

The embodiments herein generally relate to strain sensing devices and fabrication thereof, and more particularly, to a sensing device directly fabricated on a structure of interest to measure strain experienced by the structure, the fabrication involving printing or other material deposition methods and laser scanning or other selective sintering methods.

BACKGROUND

Strain sensing devices, such as strain gauges, are important sensors for testing and monitoring the reliability of functional mechanical structures such as but not limited to support beams or airplane wings. Conventionally, a strain gauge is packaged separately in a flexible form factor. For application, it is attached to the surface of the functional structure using special adhesives. This attachment procedure requires tedious surface preparation to guarantee that the strain gauge adheres well and the gap between the gauge and the functional structure is as small as possible. For some support materials, such as 3D-printed polyetherimide resin, or structures that have a curved surface, mounting a packaged strain gauge is even more difficult and thus prone to reliability issues. A conventional strain gauge is also made of either semiconductor or metal alloys. These materials do not have inherent mechanical flexibility so they are limited to certain strain levels. Thus, there is a need for a strain gauge and fabrication method that addresses these issues.

SUMMARY OF THE INVENTION

Various deficiencies in the prior art are addressed by systems, methods, architectures, mechanisms and/or apparatus configured for fabricating a strain sensing device directly on a structure by printing or otherwise depositing a material on the structure, the material exhibiting a piezo-resistive effect, and sintering a strain sensing pattern from the material such that the strain sensing pattern becomes electrically conductive.

Various other features and advantages will be made apparent from the following detailed description and the drawings.

BRIEF DESCRIPTION OF THE DRAWINGS

In order for the advantages of the invention to be readily understood, a more particular description of the invention briefly described above will be rendered by reference to specific embodiments that are illustrated in the appended drawings. Understanding that these drawings depict only exemplary embodiments of the invention and are not, therefore, to be considered to be limiting its scope, the invention will be described and explained with additional specificity and detail through the use of the accompanying drawings, in which.

DETAILED DESCRIPTION OF THE INVENTION

Figure 1:
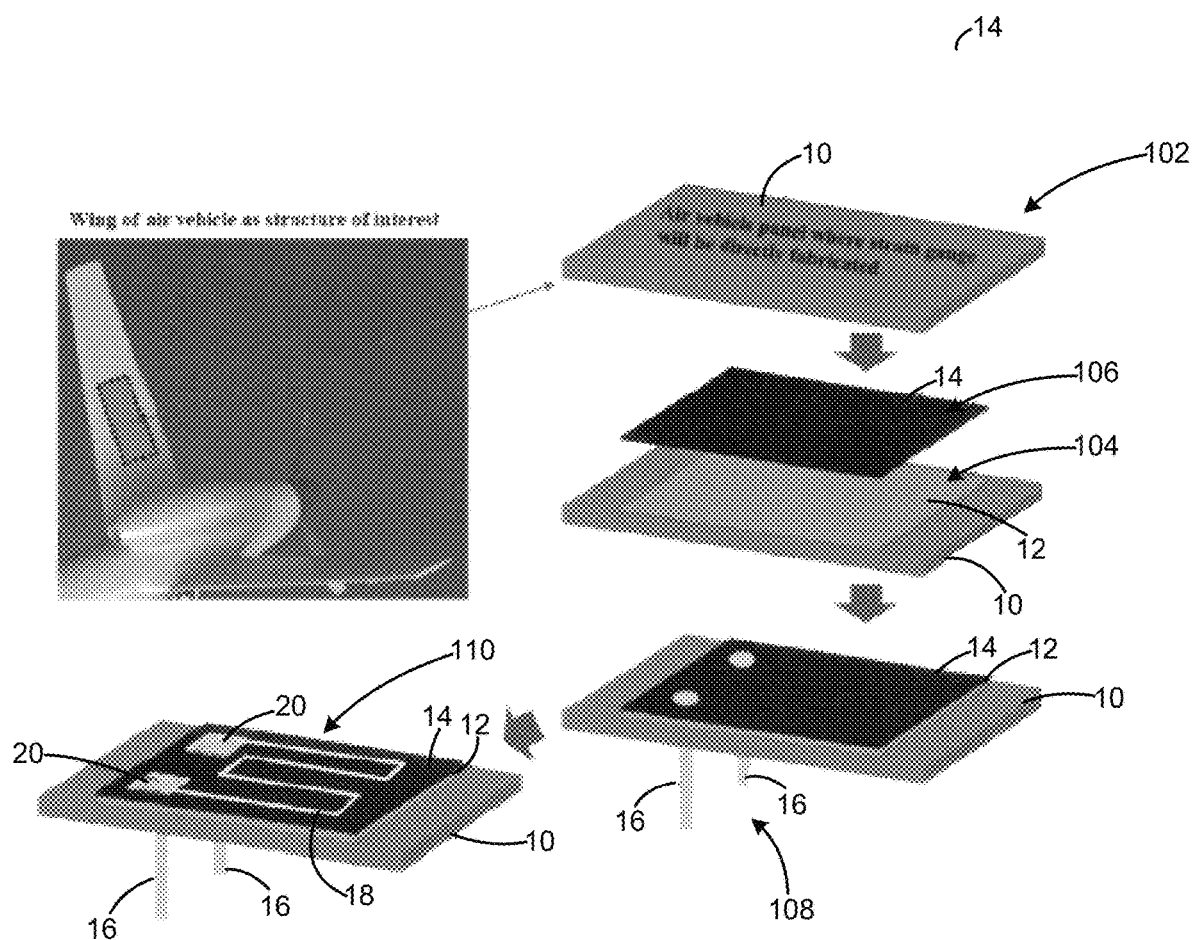
FIG. 1 depicts a diagram illustrating the steps in fabricating a graphene-based strain sensing device directly on a structure according to an embodiment of the present invention.

The following description and drawings merely illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be only for illustrative purposes to aid the reader in understanding the principles of the invention and the concepts contributed by the inventor(s) to furthering the art, and are to be construed as being without limitation to such specifically recited examples and conditions. Additionally, the term, "or," as used herein, refers to a non-exclusive or, unless otherwise indicated (e.g., "or else" or "or in the alternative"). Also, the various embodiments described herein are not necessarily mutually exclusive, as some embodiments can be combined with one or more other embodiments to form new embodiments.

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily limit any of the various claimed inventions. Moreover, some statements may apply to some inventive features but not to others. Those skilled in the art and informed by the teachings herein will realize that the invention is also applicable to various other technical areas or embodiments.

Generally speaking, the various embodiments disclosed herein introduce a sensing device directly fabricated on a structure of interest to measure the strain experienced by such structure. The fabrication generally involves printing or otherwise depositing a material that exhibits a piezo-resistive effect (such as but not limited to graphene ink) directly on the structure and drying it at low temperatures designed not to make the printed material electrically conductive. A strain sensing pattern, which is electrically conductive and exhibits piezo-resistive effect, is then created by laser scanning. The various embodiments disclosed herein improve over conventional strain gauges. They avoid the tedious surface preparation required for mounting the conventional strain gauges. Further, embodiments that use graphene as the strain gauge material improve over the conventional metallic alloys, since graphene has higher gauge factor and has inherent mechanical flexibility to handle higher strain levels. Strain sensing devices, such as strain gauges, are routinely used for mechanical testing of materials used in air vehicles as well as for monitoring purposes in on-board air vehicles.

The various embodiments disclosed herein are low cost and highly compatible with additive manufacturing.

The sensing mechanism of the various embodiment disclosed herein is based on a piezo-resistive effect. Piezo-resistive effect is the change in the electrical resistance of a material when it is subjected to strain. For some embodiments, graphene is an electrically conductive material that exhibits piezo-resistive effect. It is an attractive material for strain sensing because of its inherent mechanical flexibility and low temperature coefficient of resistance (TCR). Additionally, graphene inks for additive manufacturing are already commercially available.

FIG. 1 depicts a diagram illustrating the steps in fabricating a graphene-based strain sensing device directly on a structure according to an embodiment of the present invention. The fabrication starts at step 102 with providing a structure 10. The structure 10 may be a functional structure such as but not limited to a support beam or a wing of an air vehicle.

At step 104, an insulating layer 12 is printed or otherwise deposited on the structure 10 when the structure 10 is conductive. The insulating layer 12 may be thin (approximately 1-5 μm, though thicker or thinner insulating layers may be used) and mechanically flexible. Any insulating material that is compatible with the printer used may be used in the insulating layer 12. Some nonlimiting examples include Norland adhesive "68" and "62". It is to be noted this step is optional for non-conductive structures.

At step 106, a graphene layer 14 is printed or otherwise deposited on the structure 10. While this layer 14 is referred to as a graphene layer, other materials that exhibit a piezo-resistive effect may be used. The ink may be printed into desired patterns (e.g. lines, pads) by gravure and/or micro-dispensed printing. Any 3D printers or additive manufacturing techniques may be used as long as the ink is compatible with the printer. The functional structure 10 needing the strain sensing device is placed and secured on the platen of the printer. If the surface of the structure 10 is not sufficiently flat, the printer optionally maps the surface profile using optical profilometry (or other optical techniques) so that the print head will be able to follow the curvature of the surface. The graphene layer 14 is then printed on the structure as a rectangular patch (10 mm×20 mm). It is to be noted that the dimensions and shape of the patch can be varied as necessary and are not intended to be limiting. The thickness of the printed graphene layer 14 can also be varied as necessary but typically 10 μm thick is one nonlimiting example.

After printing, the structure 10 including the graphene layer 14 may be moved to a hot plate for the printed graphene 14 to dry. The hot plate can be set at 100° C. since at this temperature, the graphene remains electrically non-conductive after drying. It is to be noted the use of the hotplate is optional and the printed graphene 14 can also be air-dried if desired.

At step 108, pin connectors 16 may be attached to the graphene layer 14 using conductive epoxy. Nonlimiting examples of the pin connectors 16 include lead wires or header pins. These pin connectors 16 are used to connect to instruments for measuring the change in resistance of the conductive pattern as strain is applied to the functional structure 10. It is to be noted that two, four, or other multi-pin connectors 16 may be employed within the various embodiments.

At step 110, a conductive strain sensing pattern 18 is defined. The strain sensing pattern 18 may be designed using a computer aided design (CAD) software. The pattern 18 can be as simple as a U-shaped line terminated by two large contact pads 20. The pattern 18 may also be serpentine-shaped or any other pattern as desired in alternative embodiments. The pattern 18 is loaded to a laser scanning system including a near-IR laser that is operated at low power (typically about 100 mW, though more or less power may be employed). The power of the laser is optimized to sinter a local region on the printed graphene 14 exposed to the laser spot. Sintering converts the localized region exposed to the laser from insulator to conductor. Thus, by using the strain sensing pattern design to control how the laser scans on the printed graphene patch 14, a conductive pattern 18 that resembles the strain sensing design is created. By connecting a resistance meter to the contact pads 20, the electrical resistance of the pattern 18 as a function of applied strain to the structure 10 can be measured.

Optionally, a protective layer (not shown) may also be included over the graphene layer 14. This may include another insulating layer as a nonlimiting example. Parylene would be a nonlimiting example material to use for the protective layer.

Further, multiple graphene layers may be formulated on top of one another with insulating layers between them. The graphene layers may have identical conductive patterns or be different in alternative embodiments.

Figure 2:
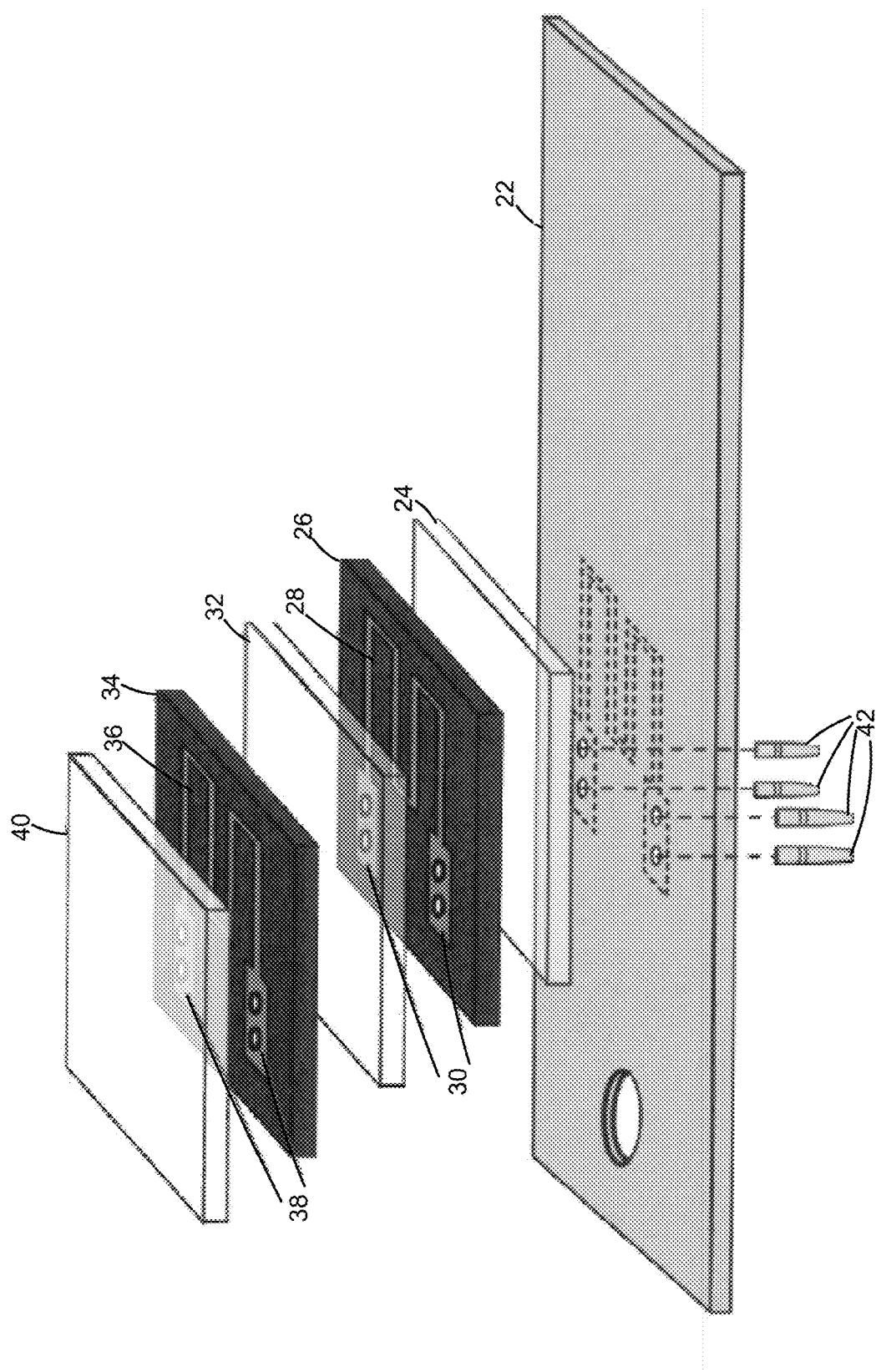
FIG. 2 depicts a diagram illustrating a multi-layer graphene-based strain sensing device printed or deposited directed on a structure according to an embodiment of the present invention.

FIG. 2 depicts a diagram illustrating a multi-layer graphene-based strain sensing device printed directed on a structure according to an embodiment of the present invention. FIG. 2 includes a structure 22. The structure 22 may be a functional structure such as but not limited to a support beam or a wing of an air vehicle.

A first insulating layer 24 is printed or otherwise deposited on the structure 22. The insulating layer 24 may be thin (approximately 1-5 μm, though thicker or thinner insulating layers may be used) and mechanically flexible. Any insulating material that is compatible with the printer used may be used in the first insulating layer 24. Some nonlimiting examples include Norland adhesive "68" and "62". It is to be noted this step is optional for non-conductive structures.

A first graphene layer 26 is printed or otherwise deposited on the structure 22 or first insulating layer 24. While this first layer 26 is referred to as a graphene layer, other materials that exhibit a piezo-resistive effect may be used. The ink may be printed into desired patterns (e.g. lines, pads) by gravure and/or micro-dispensed printing. Any 3D printers or additive manufacturing techniques may be used as long as the ink is compatible with the printer.

A first conductive strain sensing pattern 28 is defined on the first graphene layer 26. The first conductive strain sensing pattern 28 may be designed using a computer aided design (CAD) software. The first pattern 28 can be as simple as a U-shaped line terminated by two large contact pads 30. The first pattern 28 may also be serpentine-shaped or any other pattern as desired in alternative embodiments.

A second insulating layer 32 is printed or otherwise deposited on the first graphene layer 26. Similar to the first insulating layer 24, the second insulating layer 32 may be thin and mechanically flexible. Any insulating material that is compatible with the printer used may be used in the second insulating layer 32. Some nonlimiting examples include Norland adhesive "68" and "62".

A second graphene layer 34 is printed or otherwise deposited on the second insulating layer 32. As described earlier, while this second layer 34 is referred to as a graphene layer, other materials that exhibit a piezo-resistive effect may be used. The ink may be printed into desired patterns (e.g. lines, pads) by gravure and/or micro-dispensed printing. Any 3D printers or additive manufacturing techniques may be used as long as the ink is compatible with the printer. It is to be noted the second graphene layer 34 and first graphene layer 26 may be identical or different depending on the embodiment.

A second conductive strain sensing pattern 36 is defined on the second graphene layer 34. The second strain sensing pattern 36 may be designed using a computer aided design (CAD) software. The second pattern 36 can be as simple as a U-shaped line terminated by two large contact pads 38. The second pattern 36 may also be serpentine-shaped or any other pattern as desired in alternative embodiments. It is to be noted the second strain sensing pattern 36 and first strain sensing pattern 28 may be identical or different depending on the embodiment.

It is to be noted that while two graphene layers are shown in FIG. 2, any number of graphene layers with insulating layers therebetween may be printed or otherwise deposited in alternative embodiments.

An optional protective layer 40 may also be included over the second graphene layer 34. This may include another insulating layer as a nonlimiting example. Parylene would be a nonlimiting example material to use for the protective layer.

Pin connectors 42 may be attached to the first and second graphene layers 26 and 34 using conductive epoxy. Non-limiting examples of the pin connectors 42 include lead wires or header pins. These pin connectors 42 are used to connect to instruments for measuring the change in resistance of the conductive pattern as strain is applied to the functional structure 22.

During testing it is to be noted the single layer strain sensing device (as depicted in FIG. 1) obtained a gauge factor of 18.7 and the double layer strain sensing device (as depicted in FIG. 2) obtained a gauge factor of 29.4. A gauge factor (GF) of a strain sensing device is the ratio of the relative change in resistance ($\Delta R/R$) to the mechanical strain ($\varepsilon$) applied to the gauge. In the relative change in resistance, R is the resistance of the gauge without any strain and $\Delta R$ is the increase in resistance when strain is applied. For a simple cantilever beam, the mechanical strain $\varepsilon$ is defined as the relative change in cantilever length ($\Delta L/L$), where is L is the original length before bending the cantilever and $\Delta L$ is the change in length of the cantilever due to bending. Therefore, $$GF = \frac{\Delta R/R}{\varepsilon}.$$

Figure 3:
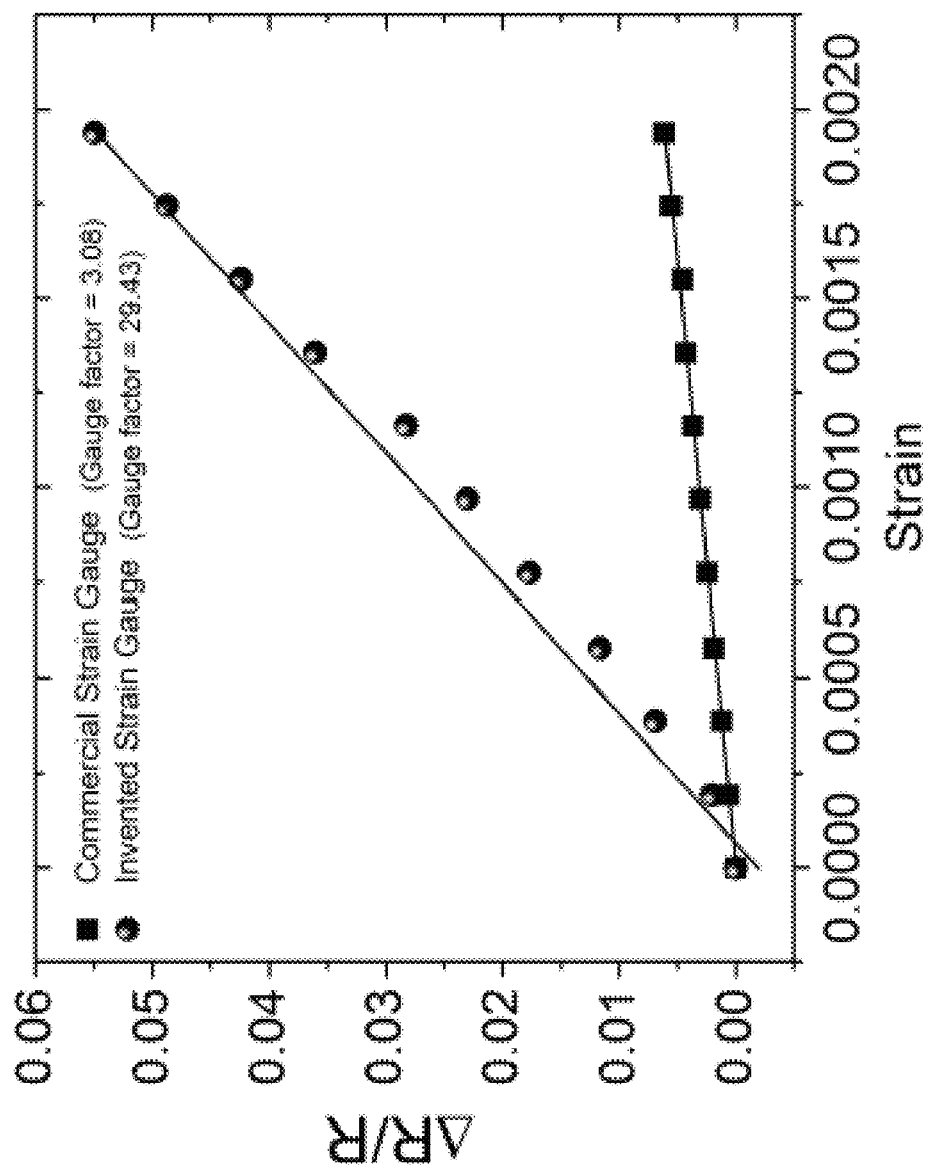
FIG. 3 depicts a graph illustrating a comparison of gauge factors between a conventional strain gauge and the multi-layer graphene-based strain sensing device according to an embodiment of the present invention.

FIG. 3 depicts a graph illustrating a comparison of gauge factors between a conventional strain gauge and the multi-layer graphene-based strain sensing device according to an embodiment of the present invention. A commercial strain gauge was tested and received a gauge factor of 3.08, significantly lower than the double-layer sensing device that obtained a gauge factor of 29.4.

In alternative embodiments, thermal sintering may be used instead of laser sintering for the graphene layer 14 to become electrically conductive. For graphene ink embodiments, the graphene ink is sintered at 250° C. for 30 minutes. For alternative embodiments, one skilled in the art would understand how long and at what temperature to sinter so that the ink becomes electrically conductive. However, the unique feature of laser sintering is that it is a localized technique. Only the printed material exposed to the laser spot becomes electrically conductive. Furthermore, the laser-induced local heating does not heat up the whole substrate unlike thermal sintering. Thus, laser sintering allows the use of substrates with low thermal budgets such as plastics. This enables direct fabrication of strain sensing devices on functional structures which are difficult to thermally sinter due to their size or temperature limitation.

In alternative embodiments, other printable metals may be used such as but not limited to Ag or Cu. However, some of these materials may not possess the mechanical flexibility inherent in graphene and their adhesion is only limited to certain other materials. As an alternative example, for polyetherimide resin, silver ink works well but it is already conductive after drying. Thus, a strain sensing pattern by laser scanning cannot be created. A strain sensing pattern may also be directly printed on functional structures without laser scanning but it is very difficult to achieve very fine conductive lines especially on a 3D-printed polyetherimide resin, which usually has a rough surface. When the surface of the structure is rough, the printed ink tends to diffuse and thus create broader lines. The use of laser scanning to create conductive lines is an attractive approach because the spatial resolution mainly relies on the spot size of the laser and not on the interaction between the ink and the substrate.

The strain sensing device can also be used as a touch or pressure sensor because touching or external normal pressure applied to the strain gauge generates strain that changes its resistance.

Thus, introduced herein are various embodiments for a strain sensing device and method for fabrication thereof, where the strain sensing device material is directly printed on a mechanical structure and a strain sensing pattern is created by laser scanning. The various embodiments eliminate the need for adhesives and tedious surface preparation, and are compatible with curved functional structures. The strain sensing device becomes part of the structure as opposed to being glued to the structure. In some embodiments, graphene is used as the strain sensing device material. Graphene has inherent mechanical flexibility and thus can handle high strain levels and high shock environments. Fabricating a graphene-based strain sensing device is an additive technique that is appealing for rapid-prototyping and low-cost manufacturing.

In alternate embodiments of the invention, one or more materials may deposited on the structure other than by printing. By way of example and not limitation, aerosol spray, a custom spray gun, rolling and/or painting may be utilized to deposit the materials onto the structure. Further, sintering maybe performed with a hand held laser engraving system, a heat gun, photonic means (e.g. ultraviolet light) and/or focused hot air.

In one aspect, the present disclosure includes a method for fabricating a strain sensing device directly on a structure, the method comprising: depositing a material on the structure, the material exhibiting a piezo-resistive effect; sintering a strain sensing pattern from the material such that the strain sensing pattern becomes electrically conductive; and attaching a pin connector to the electrically conductive strain sensing pattern.

In refining aspects, the method includes depositing an insulating layer on the structure; drying the deposited material on the structure; wherein the structure is a functional structure comprising one of a support beam and a wing of a vehicle; wherein the structure is a curved structure; further comprising mapping the curvature of the structure, wherein the depositing and sintering steps are configured to conform to a map of the curvature of the structure; wherein the material comprises one of graphene, silver, and copper; wherein the depositing includes aerosol spray, custom spray gun, rolling and or painting the material on the structure; a hand held laser engraving system, a heat gun, photonic sintering and/or focused hot air.

In another aspect, a strain sensing device is manufactured directly on a structure; an insulating layer formed on the structure; a pin connector connected to the electrically conductive strain sensing pattern; wherein the structure is a functional structure comprising one of a support beam and a wing of a vehicle; wherein the material comprises one of graphene, silver, and copper; wherein sintering comprises one of thermal and laser sintering.

In another aspect, a method for fabricating a strain sensing device directly on a structure, comprising: depositing a first material on the structure, the first material exhibiting a piezo-resistive effect; sintering a first strain sensing pattern from the first material such that the first strain sensing pattern becomes electrically conductive; depositing an insulating layer on the first material; depositing a second material on the insulating layer, the second material exhibiting a piezo-resistive effect; and sintering a second strain sensing pattern from the second material such that the second strain sensing pattern become electrically conductive.

In refining aspects, the method comprises depositing an insulating layer between the structure and first material; wherein the depositing includes aerosol spray, custom spray gun, rolling and or painting the materials on the structure; attaching a pin connector to the electrically conductive first and second strain sensing patterns; wherein the sintering includes a hand held laser engraving system, a heat gun, photonic sintering and/or focused hot air It is understood that the above-described embodiments are only illustrative of the application of the principles of the present invention. The present invention may be embodied in other specific forms without departing from its spirit or essential characteristics. All changes that come within the meaning and range of equivalency of the claims are to be embraced within their scope. Thus, while the present invention has been fully described above with particularity and detail in connection with what is presently deemed to be the most practical and preferred embodiment of the invention, it will be apparent to those of ordinary skill in the art that numerous modifications may be made without departing from the principles and concepts of the invention as set forth in the claims.

What is claimed is:

1. A method for fabricating a strain sensing device directly on a structure, the method comprising:
   depositing a material on the structure, the material exhibiting a piezo-resistive effect;
   sintering a strain sensing pattern from the material such that the strain sensing pattern becomes electrically conductive after depositing the material onto the structure; and
   attaching a pin connector to the electrically conductive strain sensing pattern.

2. The method of claim 1, further comprising depositing an insulating layer on the structure.

3. The method of claim 1, further comprising drying the deposited material on the structure.

4. The method of claim 1, wherein the structure is a functional structure comprising one of a support beam and a wing of a vehicle.

5. The method of claim 1, wherein the structure is a curved structure.

6. The method of claim 5, further comprising mapping the curvature of the structure, wherein the depositing and sintering steps are configured to conform to a map of the curvature of the structure.

7. The method of claim 1, wherein the material comprises one of graphene, silver, and copper.

8. The method of claim 1, wherein the depositing includes using aerosol spray, a custom spray gun, rolling and/or painting material onto the structure.

9. The method of claim 1, wherein the sintering comprises a hand held laser engraving system, a heat gun, photonic means and/or focused hot air.

10. A strain sensing device manufactured directly on a structure by the method recited in claim 1.

11. The strain sensing device of claim 10, further comprising an insulating layer formed on the structure.

12. The strain sensing device of claim 10, further comprising a pin connector connected to the electrically conductive strain sensing pattern.

13. The strain sensing device of claim 10, wherein the structure is a functional structure comprising one of a support beam and a wing of a vehicle.

14. The strain sensing device of claim 10, wherein the material comprises one of graphene, silver, and copper.

15. The strain sensing device of claim 10, wherein sintering comprises one of thermal and laser sintering.

16. A method for fabricating a strain sensing device directly on a structure, the method comprising:
   depositing a first material on the structure, the first material exhibiting a piezo-resistive effect;
   sintering a first strain sensing pattern from the first material such that the first strain sensing pattern becomes electrically conductive;
   depositing an insulating layer on the first material;
   depositing a second material on the insulating layer, the second material exhibiting a piezo-resistive effect; and
   sintering a second strain sensing pattern from the second material such that the second strain sensing pattern become electrically conductive.

17. The method of claim 16, further comprising depositing an insulating layer between the structure and first material.

18. The method of claim 16, wherein the depositing includes aerosol spray means, custom spray gun means, rolling and/or painting materials onto the structure.

19. The method of claim 16, further comprising attaching a pin connector to the electrically conductive first and second strain sensing patterns.

20. The method of claim 16, wherein the sintering comprises a hand held laser engraving system, a heat gun, photonic means and/or focused hot air.

21. A method for fabricating a strain sensing device directly on a structure, the method comprising:
   depositing a material on the structure, the material exhibiting a piezo-resistive effect;
   sintering a strain sensing pattern from the material such that the strain sensing pattern becomes electrically conductive;
   attaching a pin connector to the electrically conductive strain sensing pattern;
   wherein the structure is a curved structure; and
   mapping the curvature of the structure, wherein the depositing and sintering steps are configured to conform to a map of the curvature of the structure.

* * * * *